United States Patent [19]
Hawkinson

[11] Patent Number: 5,085,508
[45] Date of Patent: Feb. 4, 1992

[54] BEAM ALIGNMENT APPARATUS AND METHOD USABLE WITH PROJECTED BEAM SMOKE DETECTOR SYSTEMS

[75] Inventor: Dan Hawkinson, Aurora, Ill.

[73] Assignee: Pittway Corporation, Northbrook, Ill.

[21] Appl. No.: 465,927

[22] Filed: Jan. 16, 1990

[51] Int. Cl.$^5$ .............................................. G01B 11/26
[52] U.S. Cl. ...................................................... 356/153
[58] Field of Search ................................. 356/153, 121

[56] References Cited

U.S. PATENT DOCUMENTS 4,356,393  10/1982  Fayfield .......................... 250/214 R
4,670,741  6/1987  Cole .................................... 340/753

Primary Examiner—Samuel Turner
Attorney, Agent, or Firm—Dressler, Goldsmith, Shore, Sutker & Milnamow, Ltd.

[57] ABSTRACT

An optical alignment system includes a transmitter of a beam of radiant energy and receiver thereof. Both the transmitter and receiver carry a plurality of light emitting diodes. As the optical alignment between the transmitter and the receiver is altered, the number of diodes which is energized is increased or decreased in response to increasing or decreasing the optical coupling therebetween.

9 Claims, 2 Drawing Sheets

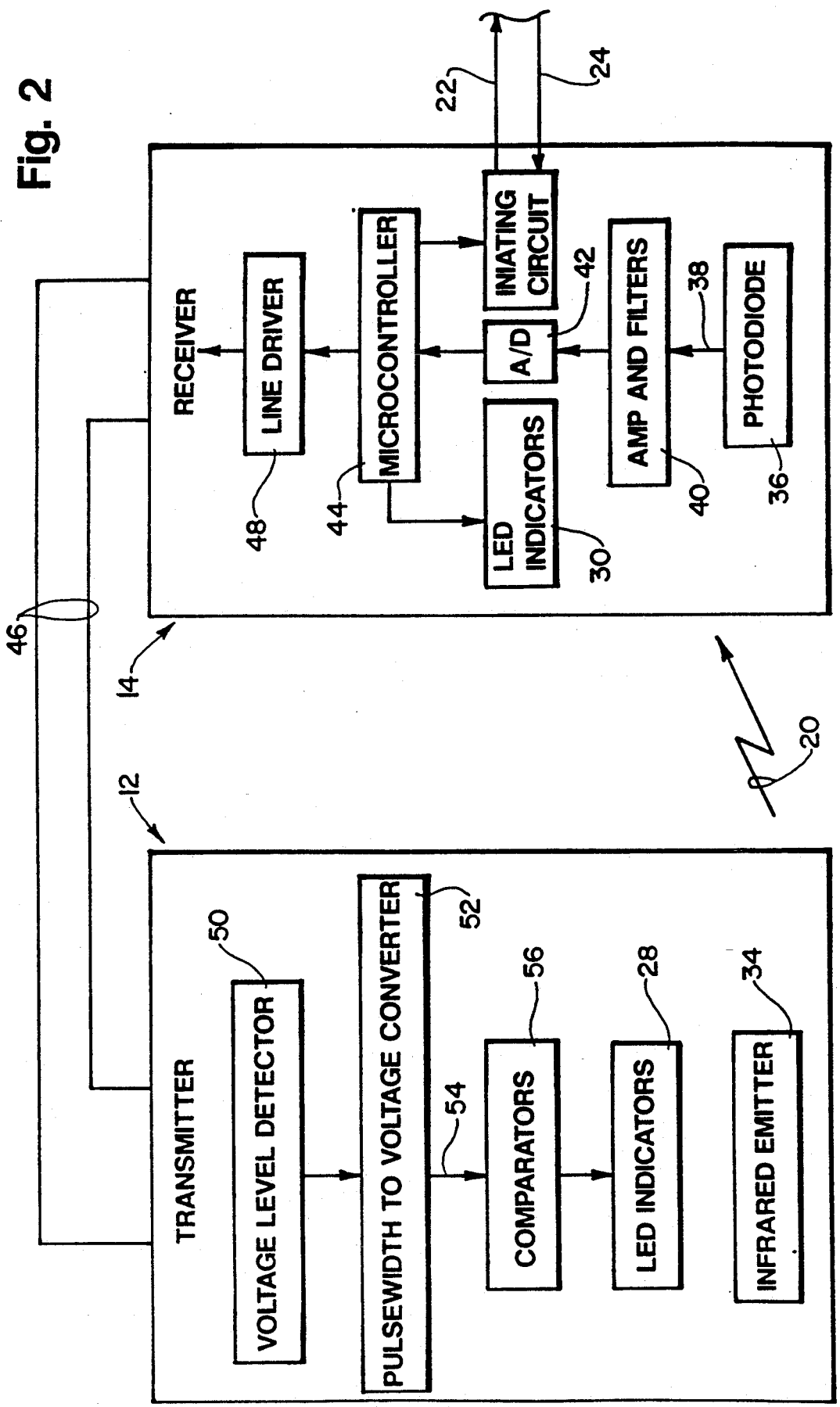

BEAM ALIGNMENT APPARATUS AND METHOD USABLE WITH PROJECTED BEAM SMOKE DETECTOR SYSTEMS

FIELD OF THE INVENTION

The invention pertains to devices and methods for the alignment of transmitters and receivers of projected beams. More particularly, the invention pertains to an apparatus and method for fast alignment of a transmitter/receiver pair in a projected beam smoke detector.

BACKGROUND OF THE INVENTION

Projected beam smoke detector systems utilize a transmitter to send a beam of radiant energy across a region to a prelocated receiver. The receiver can in turn be coupled to an alarm system or alarm panel.

Under normal ambient conditions, a known signal level is generated within the receiver in response to the incident beam. In the event that smoke begins to fill the region between the transmitter and receiver, airborne particles therefrom will interfere with the transmission of the beam to the receiver.

When the particle density is great enough in the atmosphere, the signal generated internally in the receiver due to the incident beam, will drop. When the signal drops below a predetermine threshold, the receiver generates an alarm signal to the alarm system or panel.

Projected beam systems have been found to be very useful where coverage is to be provided over a region. However, the transmitter/receiver pairs of the prior art systems have been expensive to install because it has been difficult to carry out the required alignment process.

One known approach that has been used in connection with aligning transmitter/receiver pairs has been to connect a volt meter to a receiver and to adjust the receiver and/or the transmitter to maximize the measured output voltage from the sensor and the receiver. This has been a relatively slow process and as a result such installations have been expensive. In addition, access to the electrical signals must be provided for coupling the voltmeter thereto.

Hence, there continues to be a need for a way to install and align transmitter/receiver pairs for use in projected beam smoke detector systems more efficiently and cost effectively than heretofore has been possible. Preferably, the alignment apparatus will be self-contained, not require the use of external instruments and will not add an appreciable cost to such a system.

SUMMARY OF THE INVENTION

A system is provided for efficient alignment of a transmitter/receiver pair in a projected beam-type fire detection system. The transmitter generates a beam of radiant energy. The receiver includes a radiant energy sensor. The receiver also carries a plurality of visual alignment indicators.

Coupled to the sensor is a processing circuit. The processing circuit includes signal conditioners, and filters for the electrical signals generated by the sensor. The conditioned signals are digitized in an analog-to-digital converter.

The digitized signals are compared to a plurality of predetermined thresholds in a preprogrammed digital processor. The results of the comparison operation are used to energize one or more of the visual indicators.

As the alignment between the beam transmitter and the sensor is improved the output signal generated by the sensor increases. The digitized representation thereof simultaneously increases. As a result, the number of predetermined thresholds which are being exceeded also increases.

In response to the increasing number of exceeded thresholds, a larger number of the visual indicators is turned on. Hence, improved alignment is graphically and visually indicated.

A second plurality of visual indicators can be located at the transmitter. The second plurality of indicators can be identical to the first plurality.

In this embodiment, the transmitter can be electrically coupled to the receiver. The receiver can provide electrical energy for the operation of the transmitter.

The receiver can include circuitry to generate pulses proportional to the strength of the sensed incident beam. The pulses can be transmitted to the transmitter.

The received pulses can be converted by circuitry in the transmitter to signals for energizing a corresponding number of visual indicators of the second plurality.

Hence, the alignment operation can be carried out at either the transmitter or the receiver. As a result, the present alignment apparatus and method are very cost effective. They provide a quick and easy way to align transmitter/receiver pairs when installing a beam-type fire detection system.

In the disclosed embodiment, the transmitter projects an infrared signal. The signal is received by a photo diode at the receiver and is then amplified and demodulated. An analog-to-digital converter samples the signal from the amplifier and converts it to a sequence of digital values.

The digital values are read by a microcontroller. The microcontroller uses the values to determine how many light emitting diodes to turn on.

The stronger the signal the more light emitting diodes are turned on. The microcontroller then generates and sends a low going pulse to the transmitter using a transistor line driver.

The length of the pulse is dependent on the number of light emitting diodes that are being turned on at the receiver. This pulse width can be converted to a voltage and in a similar fashion will turn on the same number of light emitting diodes at the transmitter.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE FIGURES

FIG. 2 is a block diagram of a transmitter/receiver pair of the projected beam system of FIG. 1 illustrating the present apparatus and method.

DETAILED DESCRIPTION OF THE PREFERRED EMBODIMENT

Figure 1:
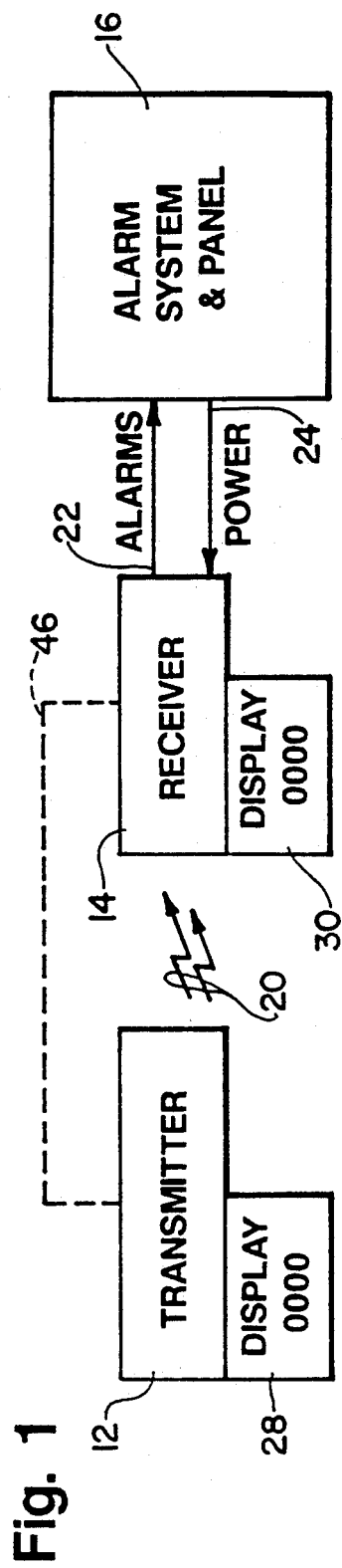
FIG. 1 is an overall block diagram of a projected beam smoke detector system incorporating the apparatus of the present invention.

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

With respect to FIG. 1, a projected beam fire detection system 10 is illustrated. The system 10 includes at least one transmitter/receiver pair 12, 14. The receiver 14 is electrically coupled by, for example, a 4-wire connection to the remainder of the alarm system and alarm panel 16.

In operation, the transmitter 12 projects a beam of radiant energy 20 to the receiver 14 where it is sensed. A decrease in the projected beam 20 sensed at the receiver 14 generates an alarm condition on electrical conductor 22. The receiver 14 can be powered via conductor 24 from the alarm system panel 16.

Both the transmitter 12 and the receiver 14 carry pluralities of light emitting diodes 28 and 30. As an alternate to light emitting diodes, other visual indicators, such as electrical lights, could be used. The members of the pluralities 28 and 30 are essentially identical.

When the system 10 is being installed, or subsequently when maintenance work is being performed thereon, it may be necessary to align the transmitter 12 with the receiver 14. When in this mode, increasing alignment between the transmitter/receiver pair 12, 14 is indicated on the displays 28 and 30 by an increasing number of the light emitting diodes or other visual display elements being energized or illuminated.

Hence, poor alignment might result in none of the visual indicators in the pluralities 28 or 30 being aligned. As the transmitter 12 or receiver 14 are moved relative to one another however, this alignment may improve at which time various elements on the displays 28 or 30 will become illuminated. As the alignment continues to improve even more of the elements in the pluralities 28 and 30 will be illuminated.

FIG. 2 illustrates in detail, the structure of the transmitter 12 and the receiver 14. The transmitter 12 includes a source of infrared light 34 which generates the projected beam 20.

The receiver 14 includes a sensor 36 such as a photo diode. Sensor 36 converts the incident infrared beam 20 to an electrical signal on a conductor. A greater degree of alignment between the incoming infrared beam 20 and the photo diode or sensor 36 will result in a larger electrical signal being generated on the conductor 38.

The electrical signal from the sensor 36 is amplified and filtered in an element 40 and digitized in an analog-to-digital converter 42.

The digitized representation from the converter 42 is sensed by a programmable controller 44. The controller 44 compares the digitized representation from the converter 42 to a plurality of predetermined thresholds.

As the signal strength on the conductor 38 increases due to improved alignment, the digital representation thereof gets larger and exceeds more of the predetermined thresholds. The controller 44 then turns on a corresponding number of the display elements or indicators in the plurality 30.

The transmitter/receiver pair 12, 14 can be electrically coupled by conductors 46. Transmitter 12 can be powered from the receiver 14 by means of the conductors 46. In addition, the conductors 46 can be used by the receiver 14 to communicate with the transmitter 12.

In this embodiment, the receiver 14 includes line driver circuitry 48 which can generate pulses having widths proportional to the magnitude of the digitized representation of the signal from the photo diode 36. Alternately, the widths of the pulses can be set by the number of exceeded predetermined thresholds as sensed by the controller 48. The pulses generated by the line driver 48 can be sent, via the conductors 46, to the transmitter 12.

The transmitter 12 includes voltage level detector circuitry 50 which is an interface circuit between the conductors 46 and a pulse width-to-voltage converter 52. The sensed pulse width on the conductors 46 is converted in the circuitry 52 to a voltage corresponding to the number of indicators in the plurality 30 which are energized.

The amplitude output from the converter circuit 52, on a line 54 is compared to a plurality of predetermined thresholds in comparator circuitry 56. Output from the comparator circuitry 56 energizes a corresponding number of indicators in the plurality 28.

Hence, the alignment operation can be carried out at either the transmitter 12 or the receiver 14. The results thereof are immediately indicated by the corresponding plurality of energized indicators in either plurality 28 or plurality 30. This results in a very fast and cost-effective installation.

While displays 28, 30 have been disclosed in terms of a plurality of display elements that are energized as a result of increasing alignment, alternate arrangements are possible. For example, a weighted display could be used.

In this embodiment, display elements could be assigned a 1, 2, 4, 8 or a 1, 10, 100 weighing corresponding pluralities of thresholds could also be provided.

As optical coupling increases, the weighted element or elements corresponding to the increasing degree of coupling would be illuminated. Similarly, if the alignment was decreasing, the weighted element or elements corresponding to a lower level of coupling would be energized.

Figure 3:
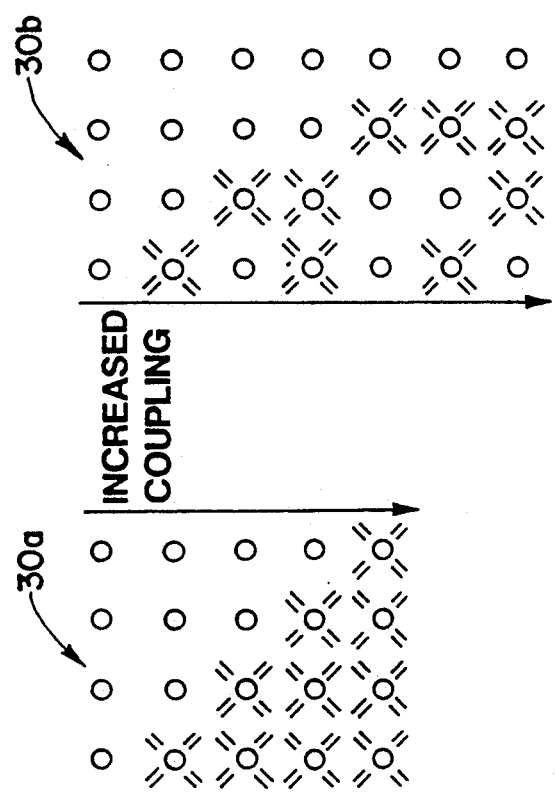
FIG. 3 illustrates two different display illumination sequences.

FIG. 3 illustrates two different illumination sequences for the display 30 in response to increased coupling. The display sequence 30a illustrates continuously illuminating all light emitting diodes, or display elements, associated with the highest exceeded present threshold as well as all diodes associated with lower thresholds.

The display sequence 30b illustrates a binary weighing and illuminating only those diodes, or display element, associated with the highest exceeded threshold. Other variations are possible.

From the foregoing, it will be observed that numerous variations and modifications may be effected without departing from the spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A system for aligning a radiant energy beam transmitted between spaced-apart transmitter-receiver units displacable with respect to one another comprising:

a source of radiant energy carried by the transmitter and a sensor carried by the receiver;

a processing circuit carried by the receiver, coupled to said sensor, including means for comparing the sensed radiant energy to a plurality of predetermined thresholds and for generating electrical signals corresponding to the results thereof;

a plurality of lightable alignment indicating members carried by the receiver and coupled to said processing circuit with an increasing number of said members illuminated in response to sensing a greater degree of radiant energy from said source, as said source is displaced relative to said transmitter;

means for communicating information extending, at least in part, between the transmitter and the receiver;

circuitry, carried by the receiver, for generating a transmittable indicium and for transmitting same to the transmitter;

indicia sensing circuitry carried by the transmitter and coupled to said communicating means;

circuitry carried by the transmitter for converting a sensed indicium to a corresponding electrical signal;

circuitry carried by the transmitter for comparing said electrical signal to a second plurality of predetermined thresholds; and a second plurality of lightable alignment indicating members carried by the transmitter and coupled to said comparing circuitry with an increasing number of said members illuminated in response to a greater degree of radiant energy from said source being sensed at the receiver as said source is displaced relative to said transmitter.

2. A system as in claim 1 wherein said communicating means includes a conducting member.

3. A system as in claim 1 with the number of illuminated members from said plurality equal to the number of illuminated members from said second plurality.

4. A system as in claim 1 with the receiver carrying a circuit for converting an electrical value to a pulse with a width corresponding to said value.

5. A system as in claim 4 including a coupling member for transferring electrical power to the transmitter to energize same with said pulse transmitted to said receiver via said coupling member.

6. A system as in claim 1 with said number of members illuminated in accordance with a pre-assigned weighing.

7. A system as in claim 6 with said comparing means including means for simultaneously illuminating all indicators corresponding to a preset sensed level of optical coupling and corresponding to a lower lever of optical coupling.

8. A system as in claim 6 with said comparing means including means for illuminating a weighted set of indicators corresponding to the greatest of said thresholds exceeded by a present sensed level of optical coupling.

9. A system as in claim 6 including alarm generation circuitry, carried by the receiver for sensing combustion and couplable to a remote alarm indicator.

* * * * *